US009310553B2

(12) United States Patent
Braunisch et al.

(10) Patent No.: US 9,310,553 B2
(45) Date of Patent: Apr. 12, 2016

(54) OPTICAL CONNECTION TECHNIQUES AND CONFIGURATIONS

(75) Inventors: Henning Braunisch, Chandler, AZ (US); Shawna M. Liff, Gilbert, AZ (US); Peter L. Chang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 270 days.

(21) Appl. No.: 13/995,136

(22) PCT Filed: Nov. 16, 2011

(86) PCT No.: PCT/US2011/061083
§ 371 (c)(1),
(2), (4) Date: Jun. 17, 2013

(87) PCT Pub. No.: WO2013/074103
PCT Pub. Date: May 23, 2013

(65) Prior Publication Data
US 2013/0272649 A1     Oct. 17, 2013

(51) Int. Cl.
*G02B 6/12* (2006.01)
*G02B 6/42* (2006.01)
*G02B 6/46* (2006.01)

(52) U.S. Cl.
CPC .............. *G02B 6/12* (2013.01); *G02B 6/4201* (2013.01); *G02B 6/4246* (2013.01); *G02B 6/4256* (2013.01); *G02B 6/4292* (2013.01); *G02B 6/46* (2013.01); *Y10T 29/49128* (2015.01)

(58) Field of Classification Search
CPC ...... G02B 6/12; G02B 6/4201; G02B 6/4246; G02B 6/4256; G02B 6/4292; G02B 6/46
USPC ............................................................ 385/14
See application file for complete search history.

(56) References Cited

U.S. PATENT DOCUMENTS

2005/0156310 A1\* 7/2005 Benner et al. ................. 257/712
2007/0267569 A1\* 11/2007 Ueno et al. .................... 250/216
2009/0297099 A1   12/2009 Benjamin et al.

FOREIGN PATENT DOCUMENTS

TW        200730907 A      8/2007

OTHER PUBLICATIONS

TW Office Action for Taiwan Patent Application No. 101142034, dated Aug. 27, 2014, 17 pages.
International Search Report and Written Opinion for PCT/US2011/061083, mailed May 4, 2012, 8 pages.

(Continued)

*Primary Examiner* — Jerry Blevins
(74) *Attorney, Agent, or Firm* — Schwabe, Williamson & Wyatt, P.C.

(57) ABSTRACT

Embodiments of the present disclosure provide optical connection techniques and configurations. In one embodiment, an apparatus includes a receptacle for mounting on a surface of a package substrate, the receptacle having a pluggable surface to receive an optical coupler plug such that the optical coupler plug is optically aligned with one or more optical apertures of an optoelectronic assembly that is configured to emit and/or receive light using the one or more optical apertures in a direction that is substantially perpendicular to the surface of the package substrate when the optoelectronic assembly is affixed to the package substrate. Other embodiments may be described and/or claimed.

13 Claims, 8 Drawing Sheets

(56) References Cited

OTHER PUBLICATIONS

International Preliminary Report on Patentability for PCT Application No. PCT/US2011/061083, dated May 30, 2014.

TW Office Action for Taiwan Patent Application No. 101142034, dated Mar. 23, 2015, 5 pages.

TW Office Action for Taiwan Patent Application No. 101142034, dated Jan. 22, 2016, 4 pages.

\* cited by examiner

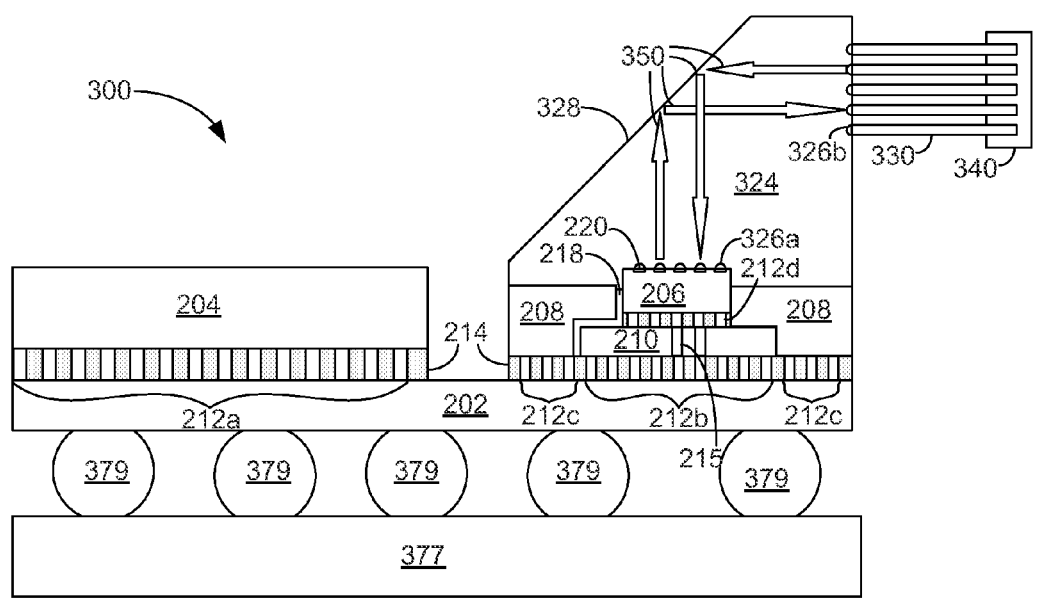
FIG. 3
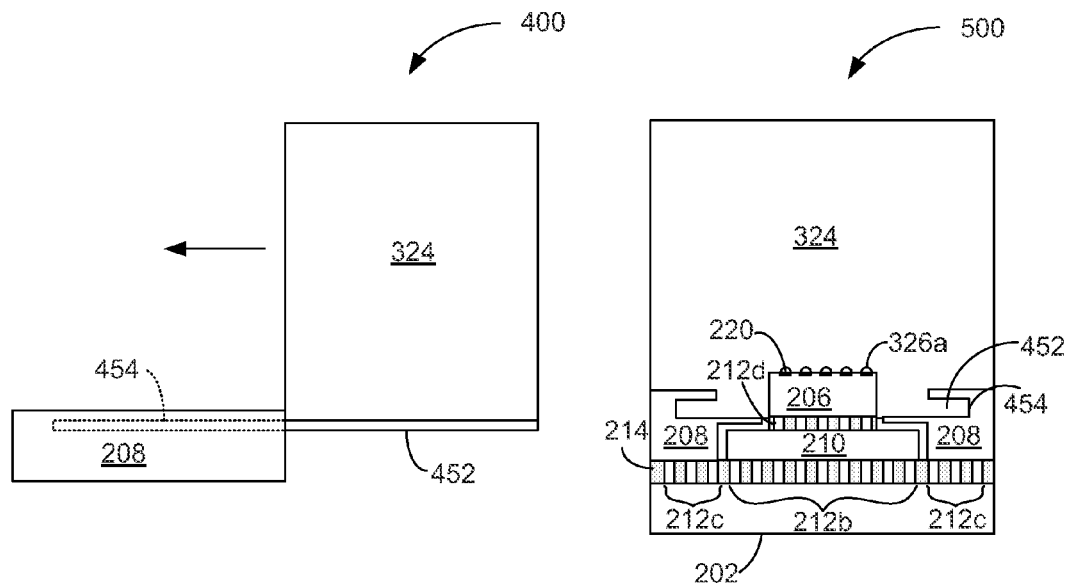
FIG. 4
FIG. 5

OPTICAL CONNECTION TECHNIQUES AND CONFIGURATIONS

CROSS REFERENCE TO RELATED APPLICATION

The present application is a national phase entry under 35 U.S.C. §371 of International Application No. PCT/U.S.2011/061083, filed Nov. 16, 2011, entitled "OPTICAL CONNECTION TECHNIQUES AND CONFIGURATIONS," which designates, among the various States, the United States of America, and the entire contents and disclosures of which are hereby incorporated by reference in their entireties.

FIELD

Embodiments of the present disclosure generally relate to the field of integrated circuits, and more particularly, to optical connection techniques and configurations for integrated circuits.

BACKGROUND

Optical components may be used to optically connect processor-based systems with one another. However, present optical components may not be pluggable (e.g., without a pigtail), or may have a profile or form factor that is too large, or may not be compatible with reflow temperatures associated with fabrication of a processor-based system. Additionally, solutions to remove heat from optical components may be needed for emerging optical configurations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 schematically illustrates a cross-section side view of a processor-based system having an optical coupler plug, in accordance with some embodiments.

FIG. 4 schematically illustrates a side view configuration of a technique to couple an optical coupler plug with a receptacle, in accordance with some embodiments.

FIG. 5 schematically illustrates another side view configuration of an optical coupler plug coupled with a receptacle, in accordance with some embodiments.

DETAILED DESCRIPTION

Figure 1:
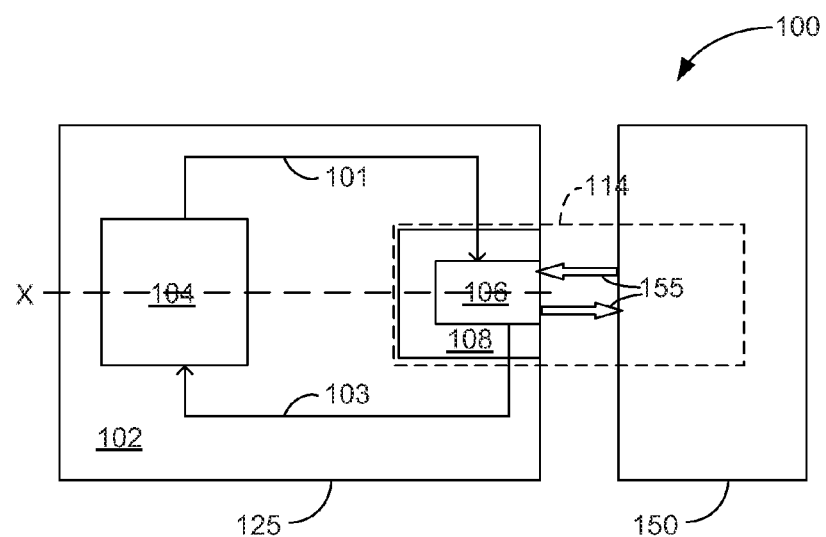
FIG. 1 schematically illustrates a top view of an example optical interconnect system.

Embodiments of the present disclosure provide optical connection techniques and configurations. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom or side. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The term "coupled" may refer to a direct connection, an indirect connection, or an indirect communication.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

According to various embodiments, the present disclosure describes a system including a package substrate having a surface upon which a processor is mounted, an optoelectronic assembly electrically coupled with the package substrate and the processor, the optoelectronic assembly having one or more optical apertures that emit and/or receive the light in a direction that is substantially perpendicular to the surface of the package substrate, and a receptacle mounted on the package substrate, the receptacle having a pluggable surface to receive an optical coupler plug such that the optical coupler plug is optically aligned with the one or more optical apertures of the optoelectronic assembly when the optical coupler plug is plugged into the pluggable surface of the receptacle.

In some embodiments, the receptacle includes an electrically insulative material and is attached to the package substrate using one or more dummy interconnect structures. In some embodiments, the one or more dummy interconnect structures include solder interconnect structures and the receptacle and the optoelectronic assembly do not physically contact one another to facilitate solder self-alignment of the receptacle relative to the package substrate.

In some embodiments, the optoelectronic assembly and receptacle are mounted adjacent to a terminating edge of the package substrate, the receptacle having a U-shape and substantially surrounding the optoelectronic assembly. The receptacle may include a material that is resistant to softening under temperature conditions associated with a solder reflow process. The receptacle may include liquid crystal polymer (LCP) and the temperature conditions may include a peak temperature less than or equal to 260° C.

In some embodiments, the processor includes a central processing unit (CPU) of a mobile device, and the optoelectronic assembly is controlled by the processor to emit and/or receive optical signals in the form of light for the processor, the optoelectonic assembly including a transceiver die mounted on the package substrate using one or more electrical interconnect structures and another die having a plurality of vertical cavity surface emitting lasers (VCSELs) and/or photodectors (PDs), the another die being mounted on the transceiver die and electrically coupled to the package substrate through the transceiver die. A surface of the receptacle that is farthest in reference to the package substrate may be closer to the surface of the package substrate than a surface of the processor that is farthest in reference to the package substrate.

In some embodiments, the system may further include the optical coupler plug, the optical coupler plug being attached to the pluggable surface of the receptacle using one or more pluggable features of the optical plug such that the optical coupler plug is optically aligned with the one or more optical apertures of the optoelectronic assembly. The optical coupler plug may include a material that is optically transparent at a wavelength of the light emitted and/or received by the optical apertures of the optoelectronic assembly, and the optical coupler plug may be configured to redirect the light by 90 degrees to or from the optoelectronic assembly.

In some embodiments, the one or more pluggable features of the optical coupler plug are configured to mate and unmate with the pluggable surface of the receptacle multiple times. The optical coupler plug may include perfluorocyclobutyl (PFCB) or glass. The package substrate may be a final product in some embodiments.

According to various embodiments, the present disclosure describes an apparatus including a receptacle for mounting on a surface of a package substrate, the receptacle having a pluggable surface to receive an optical coupler plug such that the optical coupler plug is optically aligned with one or more optical apertures of an optoelectronic assembly that is configured to emit and/or receive light using the one or more optical apertures in a direction that is substantially perpendicular to the surface of the package substrate when the optoelectronic assembly is affixed to the package substrate.

In some embodiments, the receptacle includes an electrically insulative material and is configured for attachment to the package substrate using one or more dummy interconnect structures. In some embodiments, the receptacle has a U-shape and is configured to substantially surround the optoelectronic assembly when the receptacle is attached to the package substrate. The receptacle may include a material that is resistant to softening under temperature conditions associated with a solder reflow process. In some embodiments, the receptacle includes liquid crystal polymer (LCP) and the temperature conditions include a peak temperature less than or equal to 260° C.

In some embodiments, when the receptacle is attached to the package substrate, a surface of the receptacle that is farthest to the package substrate is closer to the surface of the package substrate than a surface of a processor that is farthest to the package substrate, when the processor is mounted on the package substrate.

According to various embodiments, the present disclosure describes a method, including depositing solder interconnect material to facilitate attachment of components to a surface of a package substrate, positioning the components for attachment to the package substrate, the components including at least an optoelectronic assembly configured to emit and/or receive optical signals in the form of light for a processor, the optoelectronic assembly having one or more optical apertures that emit and/or receive the light in a direction that is substantially perpendicular to the surface of the package substrate, and a receptacle having a pluggable surface to receive an optical coupler plug such that an optical coupler plug is optically aligned to route the light to or from the one or more optical apertures of the optoelectronic assembly when the optical coupler plug is plugged into the receptacle, and reflowing the deposited solder interconnect material to form a bond between the components and the package substrate.

In some embodiments, depositing the solder interconnect material includes depositing solder interconnect material on the surface of the package substrate and positioning the components is performed using a pick-and-place process. In some embodiments, reflowing the deposited solder interconnect material forms electrical interconnect structures that electrically couple the optoelectronic assembly with the package substrate and forms dummy interconnect structures that structurally couple the receptacle with the package substrate. Positioning the components may include positioning the receptacle and the optoelectronic assembly such that they do not physically contact one another.

In some embodiments, reflowing the deposited solder interconnect material results in solder self-alignment of the receptacle and optoelectronic assembly relative to the package substrate to provide optical alignment between the one or more optical apertures of the optoelectronic assembly and the optical coupler plug when the optical coupler plug is plugged into the pluggable surface of the receptacle.

In some embodiments, positioning the components includes positioning the optoelectronic assembly and the receptacle adjacent to a terminating edge of the package substrate, the receptacle having a U-shape and substantially surrounding the optoelectronic assembly. The components may include a processor. In some embodiments, subsequent to reflowing the deposited solder interconnect material, a surface of the receptacle that is farthest in reference to the package substrate is closer to the surface of the package substrate than a surface of the processor that is farthest in reference to the package substrate.

In some embodiments, the method further includes performing a cleaning process to clean the package substrate and the components, depositing an underfill material to fill a region between the components and the package substrate, and forming an integrated heat spreader that is coupled to the optoelectronic assembly and the processor to remove heat from the optoelectronic assembly and the processor when in operation. In some embodiments, subsequent to reflowing the deposited solder interconnect material, the package is a final product without having the optical coupler plug attached. In some embodiments, the method further includes attaching the optical coupler plug to the receptacle using pluggable features of the optical coupler plug to adhere to the pluggable surface of the receptacle.

FIG. 1 schematically illustrates a top view of an example optical interconnect system 100. The optical interconnect system 100 includes a first processor-based system 125 and a second processor-based system 150 optically coupled together using one or more optical coupling elements 114, which is depicted in transparent dashed form to avoid obscuring underlying components of the first processor-based system 125. The one or more optical coupling elements 114 can include, for example, an optical coupler plug (e.g., the optical coupler plug 324 of FIG. 3), fiber optics, and/or waveguides, but is not limited to these examples. The one or more optical coupling elements 114 may provide an optical pathway for optical signals (e.g., arrows 155) in the form of light that are sent or received between the first processor-based system 125 and the second processor-based system 150.

In an embodiment, the first processor-based system 125 includes an optoelectronic assembly 106 and a receptacle 108 mounted on a package substrate 102. The optoelectronic assembly 106 may include one or more optical apertures (e.g., one or more optical apertures 220 of FIG. 2) that emit and/or receive light in a direction that is substantially perpendicular to the surface of the package substrate 102 that can be seen in FIG. 1. That is, in FIG. 1, optical apertures of the optoelectronic assembly 106 may emit and/or receive light in a direction that is in and out of the page. The optoelectronic assembly 106 can include any of a wide variety of suitable components to facilitate the reception or emission of light to or from the optical apertures including, for example, a device or die having a plurality of vertical cavity surface emitting lasers (VCSELs) and photodetectors (PDs), a transceiver device or die, and/or a planar lightwave circuit (PLC). The optoelectronic assembly 106 may include other suitable devices or structures in other embodiments.

The receptacle 108 may be positioned relative to the optoelectronic assembly 106 such that the one or more optical coupling elements 114 are optically aligned with the one or more optical apertures of the optoelectronic assembly 106 when the one or more optical coupling elements 114 are coupled with the receptacle 108. In one embodiment, the receptacle 108 has a U-shape from a top view perspective, as can be seen in FIG. 1.

The first processor-based system 125 may further include a processor 104 mounted on the package substrate 102. The processor 104 may be operatively coupled (e.g., arrows 101 and 103) with the optoelectronic assembly 106 to control sending and/or receiving of optical signals to or from the second processor-based system 150. In some embodiments, the processor 104 may be a central processing unit (CPU) or is composed of several processors. Although not shown, the second processor-based system 150 may be similarly equipped as the first processor-based system 125.

The first processor-based system 125 and/or the second processor-based system 150 may include additional components in some embodiments. For example, the first processor-based system 125 and/or the second processor-based system 150 may comport with embodiments described in connection with the example system 1600 of FIG. 16.

Figure 2:
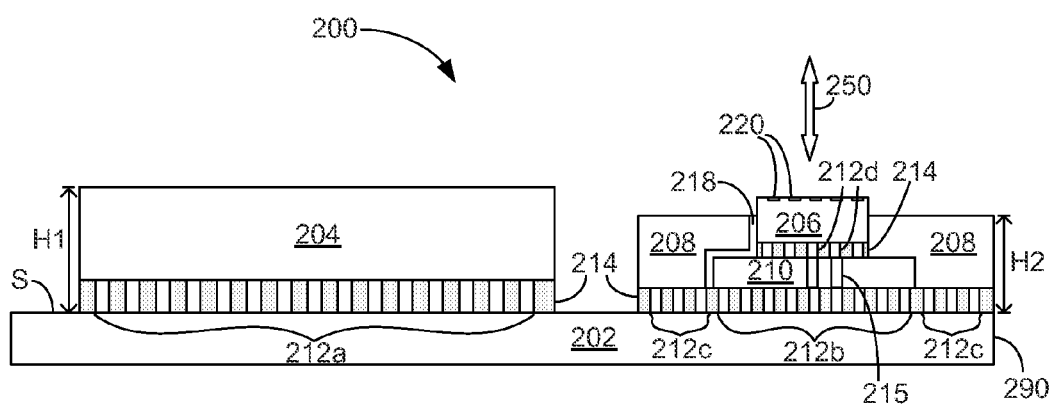
FIG. 2 schematically illustrates a cross-section side view of a processor-based system, in accordance with some embodiments.

FIG. 2 schematically illustrates a cross-section side view of a processor-based system 200, in accordance with some embodiments. The processor-based system 200 may represent a cross-section side view of the first processor-based system 125 of FIG. 1 along dashed line X in some embodiments.

The processor-based system 200 of FIG. 2 includes an optoelectronic assembly (e.g., the optoelectronic assembly 106 of FIG. 1) having an optoelectronic die 206 mounted on a transceiver die 210 for performing electro-optical functions. The transceiver die 210 is mounted on the package substrate 202. The optoelectronic die 206 includes one or more optical apertures 220 (hereinafter "optical apertures" 220) that emit or receive optical signals (e.g., arrow 250) in the form of light. The light may be emitted or received in a direction that is substantially perpendicular to a surface, S, of the package substrate 202 upon which a processor 204 is mounted, as can be seen. In some embodiments, the surface, S, may be referred to as a "top" side of the package substrate. In some embodiments, the optical apertures 220 may be associated with VCSELs and/or PDs. The optoelectronic die 206 depicted in FIG. 2 may be referred to as a back-side emitting and/or receiving device because the optical apertures 220 are positioned on a surface of the optoelectronic die 206 that is opposite to an active surface of the optoelectronic die 206 that includes electrical structures (e.g., active devices such as transistors, laser diodes, or PD diodes) that may be flip-chip mounted on the transceiver die 210, as can be seen in FIG. 2.

Although the embodiment of FIG. 2 depicts the optoelectronic die 206 mounted on the transceiver die 210, in other embodiments the optoelectronic die 206 may be mounted directly on the package substrate 202. In still other embodiments, the optoelectronic die 206 may be mounted on an interposer for heat conduction that is mounted on the package substrate 202. A transceiver die 210 may be mounted on the package substrate 202 adjacent to the interposer.

The optoelectronic die 206 may be coupled to the transceiver die 210 using one or more interconnect structures 212d. The one or more interconnect structures 212d may comprise any suitable electrically conductive material including, for example, metal, solderable material, or conductive epoxy and may include any suitable structure including, for example, bumps or posts. Other materials and/or structures can be used for the one or more interconnect structures 212d in other embodiments. An underfill material 214 may be deposited to substantially fill a region between the optoelectronic die 206 and the transceiver die 210 and encapsulate the one or more interconnect structures 212d. The underfill material 214 may be composed of an electrically insulative material.

The transceiver die 210 may be coupled to the package substrate 202 using one or more interconnect structures 212b. The one or more interconnect structures 212b may comport with embodiments already described in connection with the one or more interconnect structures 212d. The transceiver die 210 may have one or more through-substrate vias (TSVs) 215, such as through-silicon vias, formed therein to facilitate routing of electrical signals between the optoelectronic die 206 and the package substrate 202. For example, electrical signals received by the transceiver die 210 from the optoelectronic die 206 using the one or more interconnect structures 212d can be routed to the package substrate 202 using the one or more TSVs 215 and the one or more interconnect structures 212b. Electrical signals received by the transceiver die 210 by way of the package substrate 202 can be routed to the optoelectronic die 206 using the one or more TSVs 215 and the one or more interconnect structures 212d. The package substrate 202 may include features such as traces or interconnect layers (not shown) that route electrical signals between the processor 204 and the optoelectronic assembly including the transceiver die 210 and the optoelectronic die 206.

The processor 204 may be coupled to the package substrate 202 using one or more interconnect structures 212a that may comport with embodiments already described in connection with the one or more interconnect structures 212d. Underfill material 214 may be disposed between the transceiver die 210 and the package substrate 202 and/or between the processor 204 and the package substrate 202, as can be seen, in some embodiments.

The processor-based system 200 further includes a receptacle 208 mounted on the package substrate 202. The receptacle 208 may be disposed adjacent to the optoelectronic assembly (e.g., the optoelectronic die 206 and the transceiver die 210 of FIG. 2) and may include a pluggable surface to receive an optical coupler plug (e.g., the optical coupler plug 324 of FIG. 3) such that the optical coupler plug is optically aligned with the optical apertures 220 of the optoelectronic assembly when the optical coupler plug is plugged into the pluggable surface of the receptacle 208. Example configurations for a pluggable surface of the receptacle 208 are depicted and described in connection with FIGS. 4-7.

The receptacle 208 may be coupled with the package substrate 202 using one or more dummy interconnect structures 212c. The term "dummy" is used to indicate that the interconnect structures 212c are non-functional and are not electrically active when the processor-based system 200 is in operation. The receptacle 208 may be mounted on the package substrate 202 using a flip-chip process to provide a "flip-chip receptacle" (FCR). The one or more dummy interconnect structures 212c may include dummy pads, bumps, or pillars that facilitate the use of a solder/reflow process to bond the receptacle 208 to the package substrate 202. In some embodiments, a surface of the receptacle 208 is bumped and positioned on the package substrate 202 for reflow.

The receptacle 208 may be composed of an electrically insulative material such as, for example, a polymer. In some embodiments, the receptacle 208 is composed of a material that is resistant to softening under temperature conditions associated with a solder reflow process such as, for example, a ball-grid array (BGA) solder reflow process. The temperature conditions may include a peak temperature of less than or equal to 260° C. in some embodiments. In one embodiment, the receptacle 208 is composed of liquid crystal polymer (LCP) or other suitable material that can withstand heat (resist softening) under temperature conditions associated with a solder reflow process. According to various embodiments, the processor-based system 200 is composed of temperature resistant components such that the components can withstand temperature conditions (e.g., resist softening) associated with solder reflow processes.

In some embodiments, the receptacle 208 is positioned such that it does not physically contact components of the optoelectronic assembly (e.g., the optoelectronic die 206 and the transceiver die 210) to allow or facilitate solder self-alignment of the receptacle 208 relative to the package substrate 202. For example, an air gap 218 may be provided between the receptacle 208 and components of the optoelectronic assembly. Using solder self-alignment techniques to attach the receptacle 208 to the package substrate 202 may facilitate passive optical alignment of the optoelectronic assembly with an optical coupler plug (e.g., the optical coupler plug 324 of FIG. 3) that can be plugged into the receptacle 208. In some embodiments, multiple components including, for example, the receptacle 208, the processor 204, and the optoelectronic assembly may be bumped, placed on the package substrate 202, and subjected to a reflow process that simultaneously forms solder bonds between the components and the package substrate 202. Using a heat resistant material for the receptacle 208 may allow the receptacle 208 to be attached using a reflow process.

The receptacle 208 may include a variety of shapes and configurations. In some embodiments, the receptacle 208 is configured to house or substantially surround the optoelectronic assembly. The receptacle 208 may be centered about the optoelectronic assembly (e.g., optoelectronic assembly 106 of FIG. 1 or optoelectronic die 206/transceiver die 210 of FIG. 2) such that the receptacle does not cover the optical apertures 220 of the optoelectronic assembly. In one embodiment, the receptacle 208 has a U-shape (e.g., see the top view of the receptacle 108 of FIG. 1). The receptacle 208 may be positioned adjacent to or flush with a terminating edge 290 of the package substrate 202, as can be seen.

In some embodiments, the receptacle 208 may straddle the optoelectronic assembly such that one or more components of the optoelectronic assembly can extend under and/or beyond terminating edges of the receptacle 208 when viewed from a top view. For example, briefly referring to FIG. 1, the receptacle 108 may straddle the optoelectronic assembly 106 to allow the optoelectronic assembly 106 to extend in a direction towards the processor 104 beyond the terminating edge of the receptacle 108. Such configuration may be used, for example, in a case where the optoelectronic assembly includes a PLC device. Returning to FIG. 2, the receptacle 208 may be composed of a single continuous material structure in some embodiments.

The configurations described for the optoelectronic assembly and receptacle 208 may provide a scalable low-profile optical connection for the processor-based system 200. For example, a surface of the receptacle 208 that is distal or farthest to the package substrate 202 may be closer to the surface S of the package substrate 202 than a surface of the processor 204 that is distal or farthest to the surface S of the package substrate 202. That is, a height, H1, of the processor 204 from the surface S of the package substrate 202 may be greater than a height, H2, of the receptacle 208 from the surface S of the package substrate 202. Such dimensions may allow a heat spreader (not shown) such as an integrated heat spreader (IHS) that may be coupled to remove heat from a top surface of the processor 204 to be applied to the optoelectronic assembly as well.

Although not shown, the processor-based system 200 may include a variety of other components mounted thereon including, for example, capacitors, heat spreaders, and the like. In some embodiments, the processor-based system 200 is a final product. The term "final product" may refer to a product that is ready for shipping to a customer.

FIG. 3 schematically illustrates a cross-section side view of a processor-based system 300 having an optical coupler plug 324, in accordance with some embodiments. The processor-based system 300 may include another electronic device such as a printed circuit board (PCB) 377 coupled with the package substrate 202 using one or more second-level interconnect structures (e.g., solder balls 379). The PCB 377 may route electrical signals to or from the components (e.g., the processor 204, transceiver die 210, and optoelectronic die 206) mounted on the package substrate 202 through the one or more solder balls 379. In some embodiments, the receptacle 208 is coupled to the package substrate 202 prior to coupling the PCB 377 using second-level interconnect structures. The receptacle 208 may resist softening under temperature conditions associated with reflowing the solder balls 379 to form the second-level interconnects. Other suitable boards or electronic devices can be coupled to the package substrate 202 using other types of second-level interconnect structures in other embodiments.

The processor-based system 300 may further include an optical coupler plug 324 attached to the receptacle 208 such that the optical coupler plug 324 is optically aligned with the optical apertures 220 of the optoelectronic assembly. The optical coupler plug 324 may be generally composed of a material that is optically transparent at a wavelength of the light (e.g., arrows 350) emitted and/or received by the optical apertures 220 of the optoelectronic assembly. The optical coupler plug 324 may be configured to redirect the light by 90 degrees to or from the optical apertures 220 of the optoelectronic assembly, which may facilitate a smaller form factor or lower profile for the processor-based system 300. In some embodiments, the optical coupler plug 324 may include a reflective surface 328 such as a total internal reflection (TIR) mirror or a metalized mirror to redirect the light.

In some embodiments, the optical coupler plug 324 may include lens array structures 326a, 326b to increase coupling efficiency. For example, the lens array structures 326a, 326b may provide an expanded or collimated beam of light (e.g., the arrows 350) in the optical coupler plug 324 that may facilitate alignment by alleviating alignment tolerances between the optical coupler plug 324 and other components such as the optical apertures 220 of the optoelectronic assembly. The lens array structures 326a can be directly attached to the optical apertures 220. In some embodiments, the lens array structures 326a may be integrally formed on the optical apertures 220 using wafer level fabrication techniques. Additional lens structures may be provided at the various interfaces between components along the optical signal path or paths.

The optical coupler plug 324 may be further coupled to one or more other optical coupler elements such as, for example, an optical array structure 330 (e.g., fiber optic or waveguide) and/or an optical joint structure 340 (e.g., multi-terminal (MT) ferrule or micro-joint connector). In some embodiments, the optical coupler plug 324 may include one or more alignment guide holes or pins to facilitate coupling of the optical array structure 330 and/or optical joint structure 340 to the optical coupler plug 324. Other suitable structures to optically couple the processor-based system 300 with other processor-based systems may be used in other embodiments.

In some embodiments, the optical coupler plug 324 may be composed of a material that is not resistant to softening under temperature conditions associated with a solder reflow process (e.g., peak temperature of 260° C. or below). For example, the optical coupler plug 324 may be composed of polyetherimide or polycarbonate materials and the like. In such embodiments, the optical coupler plug 324 may be attached to the receptacle 208 subsequent to any reflow processes or other higher temperature processes that may cause the optical coupler plug 324 to soften. In some embodiments, the optical coupler plug 324 may be attached by a customer of the processor-based system 200 of FIG. 2.

In other embodiments, the optical coupler plug 324 may be composed of a material that is resistant to softening under temperature conditions associated with a solder reflow process (e.g., peak temperature of 260° C. or below). For example, the optical coupler plug 324 may be composed of perfluorocyclobutyl (PFCB), glass or other similar material. A coefficient of thermal expansion (CTE) of the PFCB may be reduced by addition of lower-CTE particles with matching refractive index that provide low optical loss such as, for example, silica particles. In such embodiments, the optical coupler plug 324 may be attached to the receptacle 208 prior to coupling the package substrate 202 and the PCB 377. In other embodiments, the optical coupler plug 324 and the receptacle 208 may be integrally formed. That is, the optical coupler plug 324 and the receptacle 208 may be a single, continuous material structure referred to as a "flip chip coupler" (FCC) in some embodiments. In some embodiments where solder self-alignment is not used to attach the receptacle 208, the receptacle 208 may be aligned to the optical apertures 220 using, for example, kinematic features that may be disposed on the optoelectronic assembly (e.g., the optoelectronic die 206). Such receptacle 208 may be permanently attached to the optoelectronic assembly using an adhesive such as, for example, a die attach film.

Although not shown, the processor-based system 300 may include a variety of other components mounted thereon including capacitors, heat spreaders, and the like. In some embodiments, the processor-based system 300 is a final product. In other embodiments, the processor-based system 300 without the PCB and solder balls 379 is a final product. The processor-based system 200 of FIG. 2 or the processor-based system 300 of FIG. 3 may be shipped with a removable protective structure (not shown) such as a cap to cover the optical components (e.g., 206 and/or 324). A protective structure may be used to cover the optical components during the assembly of the processor-based system 300.

In some embodiments, the optical coupler plug 324 may be attached to the receptacle 208 by plugging into or otherwise fastening the optical coupler plug 324 with a pluggable surface of the receptacle 208 using one or more pluggable features. An example configuration is depicted in FIG. 4, which schematically illustrates a side view configuration 400 of a technique to couple an optical coupler plug 324 with a receptacle 208, in accordance with some embodiments. Referring briefly to FIG. 4, the optical coupler plug 324 may include a pluggable feature 452 that can slide or otherwise engage with a pluggable surface such as socket feature 454 of the receptacle 208. In some embodiments, the configuration 400 allows a horizontal direction of insertion (e.g., in the direction of the arrow), as can be seen. FIG. 5 schematically illustrates another side view configuration 500 of an optical coupler plug 324 coupled with a receptacle 208 using a pluggable feature 452 and a socket feature 454, in accordance with some embodiments. The side view configuration 500 may represent the side view configuration 400 from another perspective.

Figure 6:
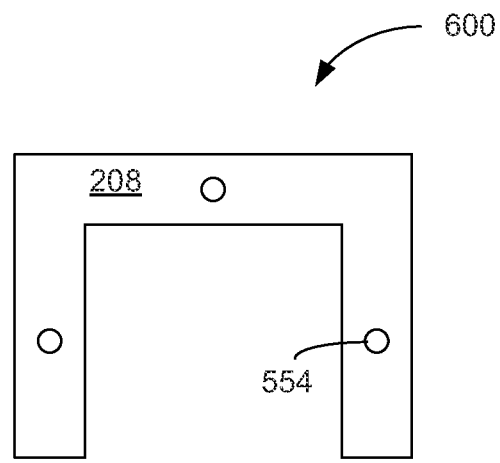
FIG. 6 schematically illustrates a top view of a pluggable surface of a receptacle, in accordance with some embodiments.
Figure 7:
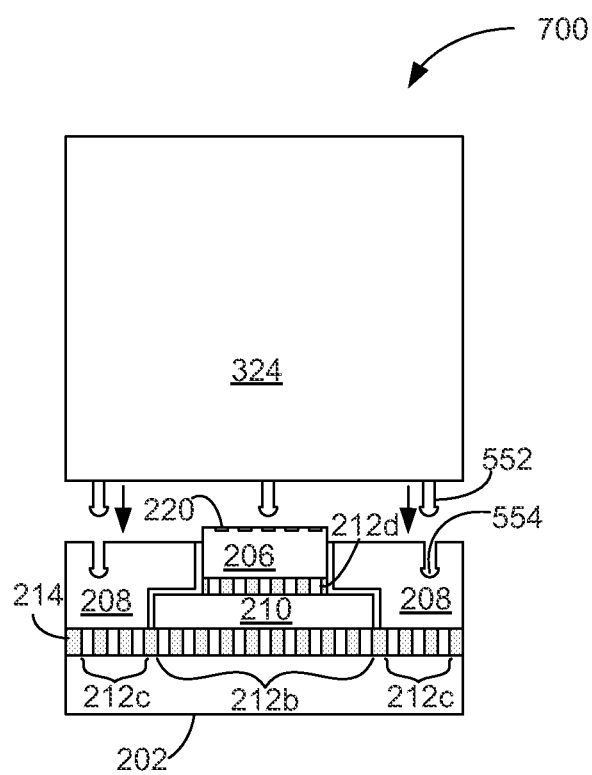
FIG. 7 schematically illustrates a side view configuration of another technique to couple an optical coupler plug with a receptacle, in accordance with some embodiments.

FIG. 6 schematically illustrates a top view configuration 600 of a pluggable surface of a receptacle 208, in accordance with some embodiments. Referring briefly to FIG. 6, the receptacle 208 may include one or more socket structures 554 that are configured to receive pluggable features of the optical coupler plug 324. For example, referring briefly to FIG. 7, a side view configuration 700 includes one or more pluggable features 552 of the optical coupler plug 324 that are configured to mate (e.g., in the direction of the arrows) with the one or more socket structures 554 of the receptacle 208. In some embodiments, the configuration 700 allows a vertical direction of insertion (e.g., in the direction of the arrow) of the optical coupler plug 324, as can be seen.

In some embodiments, the pluggable features described herein may be reversed for the optical coupler plug 324 and the receptacle 208. For example, the receptacle 208 of FIG. 7 may include one or more pluggable features (e.g., similar to the one or more pluggable features 552) and the optical coupler plug 324 may include one or more socket structures (e.g., similar to the one or more socket structures 554). The pluggable features of the optical coupler plug 324 may include more or less features or other types of fastening structures than depicted.

In some embodiments, the pluggable features (e.g., the pluggable feature 452 of FIGS. 4-5 or the one or more socket structures 554 of FIGS. 6-7) of the optical coupler plug 324 are configured to mate and unmate with the pluggable surface (e.g., the socket 454 of FIGS. 4-5 or the one or more socket structures 554 of FIGS. 6-7) of the receptacle 208 multiple times. For example, the pluggable features of the optical coupler plug 324 may be configured to mate and unmate at least 25 times. A clip (not shown) may be used to provide strain relief between the optical coupler plug 324 and the receptacle 208 and/or retain the optical coupler plug 324 fastened. In other embodiments, the pluggable features of the optical coupler plug 324 are configured to permanently affix the optical coupler plug 324 to the receptacle 208. Permanent fastening of the optical coupler plug 324 to the receptacle 208 may be used in embodiments when the package substrate 202 is in a ball-grid array (BGA) configuration.

Figure 8:
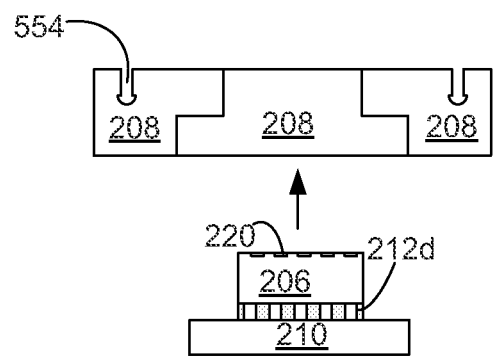
FIGS. 8-10 schematically illustrate a technique for coupling an optoelectronic assembly and a receptacle to a package substrate, in accordance with some embodiments.
Figure 9:
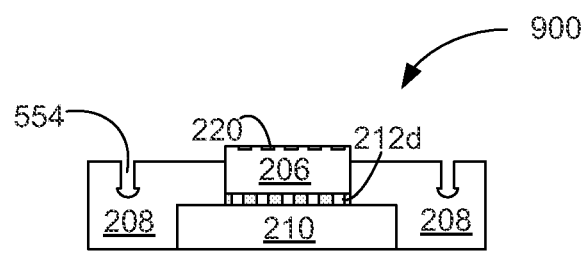
Figure 10:
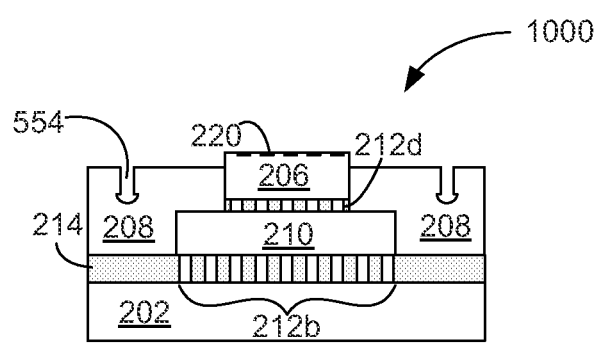

FIGS. 8-10 schematically illustrate a technique for coupling an optoelectronic assembly (e.g., the optoelectronic die 206 and the transceiver die 210) and a receptacle (e.g., receptacle 208) to a package substrate (e.g., package substrate 202), in accordance with some embodiments. Referring to FIG. 8, in some embodiments, the optoelectronic assembly having the optical apertures 220 is coupled with the receptacle 208 prior to coupling the optoelectronic assembly and the receptacle 208 to the package substrate 202. The optoelectronic assembly may be aligned and attached to the receptacle 208 using, for example, kinematic alignment features and an adhesive such as epoxy to form a sub-assembly 900 as depicted in FIG. 9. A mechanical stop (not shown) may be used to control vertical alignment (e.g., in the direction of the arrow of FIG. 8). The sub-assembly 900 of FIG. 9 may be subsequently coupled with the package substrate 202 using, for example, a soldering and underfill process to form the one or more interconnect structures 212b and underfill material 214 of assembly 1000 depicted in FIG. 10.

Figure 11:
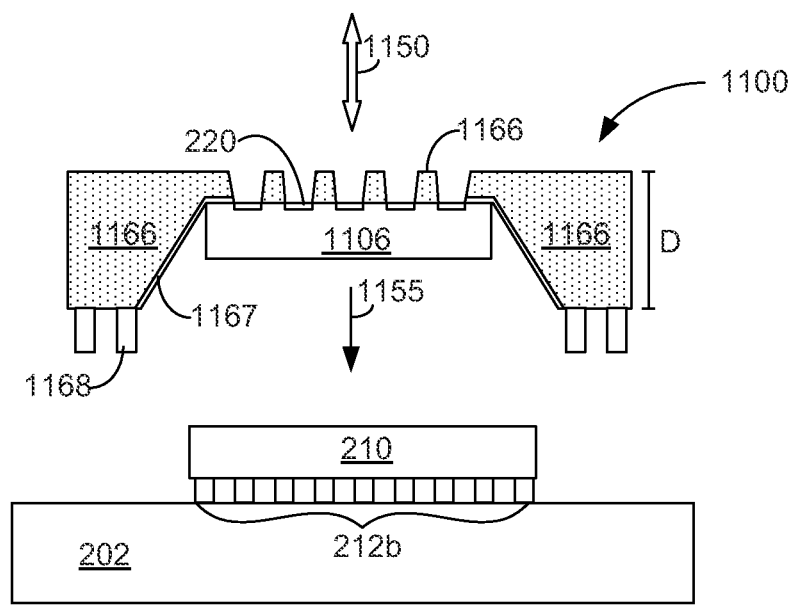
FIG. 11 schematically illustrates a technique for coupling an optoelectronic assembly to a package substrate, in accordance with some embodiments.

FIG. 11 schematically illustrates a technique for coupling an optoelectronic assembly to a package substrate 202, in accordance with some embodiments. In some embodiments, the optoelectronic assembly includes an optoelectronic die 1106 referred to as a "front-side emitting and/or receiving" optoelectronic die. In a front-side emitting and/or receiving optoelectronic die 1106, the optical apertures 220 are formed on an active surface of the optoelectronic die 1106 that includes electrical structures (e.g., active devices such as transistors, laser diodes, or PD diodes) formed thereon. That is, the optical apertures 220 of the optoelectronic die 1106 may be disposed on a surface that is opposite to the optical apertures 220 of the optoelectronic die 206 of FIG. 2.

An interposer 1166 or carrier may be coupled with the active surface of the optoelectronic die 1106 to provide electrical routing (e.g., traces 1167 and interconnects 1168) between the optoelectronic die 1106 and the package substrate 202. One or more openings may be formed in the interposer 1166 to allow light (e.g., arrow 1150) to be emitted and/or received by the optical apertures 220 of the optoelectronic die 1106, as can be seen. In some embodiments, the interposer 1166 may be composed of a semiconductor material such as silicon. The interposer 1166 may further include other materials such as, for example, silicon dioxide to provide electrical insulation and/or passivation. The interconnects 1168 and/or traces 1167 may be formed using an electrically conductive material such as, for example, copper. The interposer 1166 may have a dimension, D, of about 200 microns in some embodiments. The interposer assembly 1100 including the interposer 1166 and the optoelectronic die 1106 may be coupled with the package substrate 202 in the direction indicated by the arrow 1155 using any suitable means such as a reflow or thermocompression bonding process. The interposer assembly 1100 can be used in other configurations for optoelectronic assemblies described herein.

Figure 12:
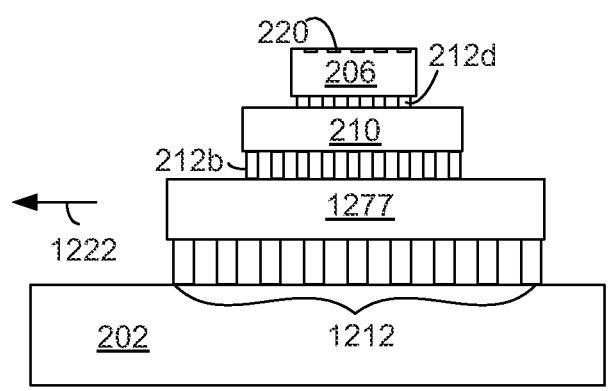
FIG. 12 schematically illustrates an optoelectronic assembly and thermal interposer coupled with a package substrate, in accordance with some embodiments.

FIG. 12 schematically illustrates an optoelectronic assembly (e.g., the optoelectronic die 206 and transceiver die 210) and thermal interposer 1277 coupled with a package substrate 202, in accordance with some embodiments. The thermal interposer 1277 may provide a horizontal thermal path (e.g., in the direction of arrow 1222) for heat dissipation away from the optoelectronic assembly and may further provide an electrical path to the package substrate 202 for the electrical signals of the optoelectronic assembly. For example, the thermal interposer 1277 may conduct heat towards an IHS of a processor-based system and one or more interconnect structures 1212 may provide electrical routing for electrical signals of the optoelectronic die 206 and/or the transceiver die 210. Although not shown, a receptacle (e.g., the receptacle 208 of FIG. 2) may be configured to straddle the thermal interposer 1277 such that the thermal interposer 1277 can extend beyond a terminating edge or boundary of the receptacle (e.g., towards processor 204 of FIG. 2). In some embodiments, a U-shaped receptacle (e.g., the receptacle 108 of FIG. 1) may be rotated 180 degrees from the configuration depicted in FIG. 1 to allow the thermal interposer to extend (e.g., towards the processor 104 of FIG. 1) beyond the terminating edge of the receptacle.

The thermal interposer 1277 may be formed using, for example, a semiconductor material such as silicon. Other suitable materials can be used in other embodiments. In some embodiments, the transceiver die 210 may be integrated with or formed as part of the thermal interposer 1277, which may eliminate a die from the depicted stack of FIG. 12 and reduce assembly complexity.

Figure 13:
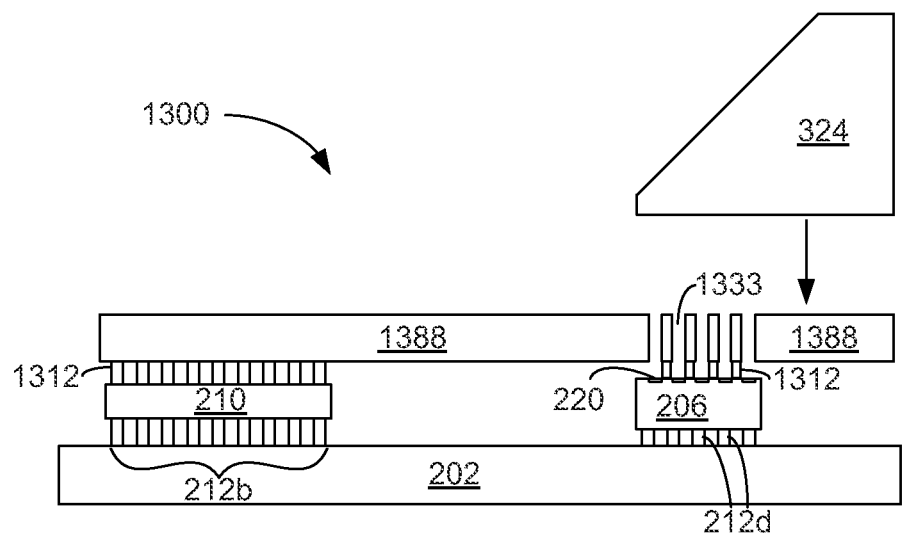
FIG. 13 schematically illustrates a configuration for removing heat from components on a package substrate, in accordance with some embodiments.

FIG. 13 schematically illustrates a configuration 1300 for removing heat from components on a package substrate 202, in accordance with some embodiments. A transceiver die 210 and optoelectronic die 206 may be coupled to a package substrate 202, as shown. A thermal tongue 1388 composed of a thermally conductive material may be thermally coupled to the transceiver die 210 and the optoelectronic die 206 using one or more thermally conductive interconnects 1312. In some embodiments, the thermal tongue 1388 may be thermally coupled with an IHS of a processor-based system. The thermal tongue 1388 may be composed of an optically transparent material and/or include an optical through-hole (OTH) 1333 formed therein to allow light emitted from and/or received by the optical apertures 220 to pass through the thermal tongue 1388 to an optical coupler plug 324.

The optical coupler plug 324 may be coupled in the direction of the arrow to a receptacle (e.g., receptacle 208 of FIG. 2), which is not shown in FIG. 13 to avoid obscuring aspects of the configuration 1300. Although not shown, the receptacle may be configured to straddle the thermal tongue 1388 or may be otherwise configured (e.g., as described in connection with FIG. 12) to allow the thermal tongue 1388 to extend beyond a terminating edge of the receptacle. Although not shown, lens array structures (e.g., similar to lens array structures 326a of FIG. 3) may be formed on the optical apertures 220 or on the thermal tongue 1388 to provide collimated light between the optoelectronic die 206 and the optical coupler plug 324.

Figure 14:
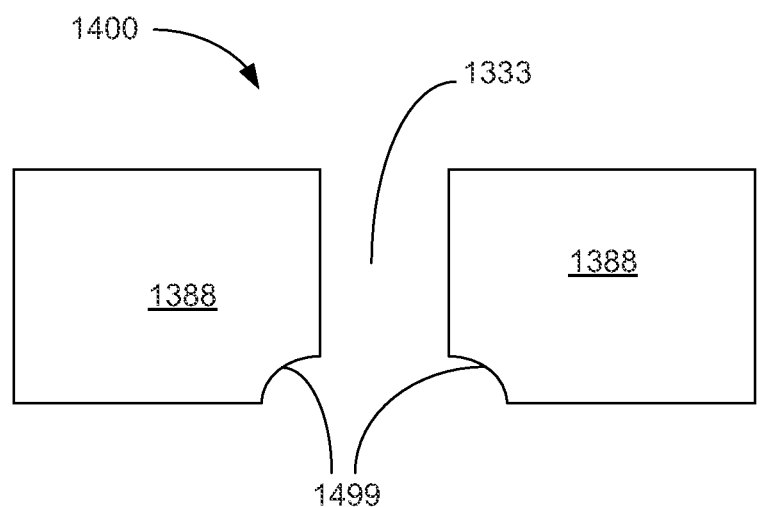
FIG. 14 schematically illustrates a configuration for an optical through-hole (OTH), in accordance with some embodiments.

FIG. 14 schematically illustrates a configuration 1400 for an optical through-hole (OTH) 1333, in accordance with some embodiments. Bonding the thermal tongue 1388 of FIG. 13 with the optoelectronic die 206 of FIG. 13 using a bonding agent such as solder may result in excessive bonding agent spreading and contamination of the optical apertures. One or more annular pockets 1499 may be formed to surround the OTH 1333 of the thermal tongue 1388 to accommodate any excess bonding agent. The embodiments described in connection with FIGS. 1-14 may be combined in some embodiments.

Figure 15:
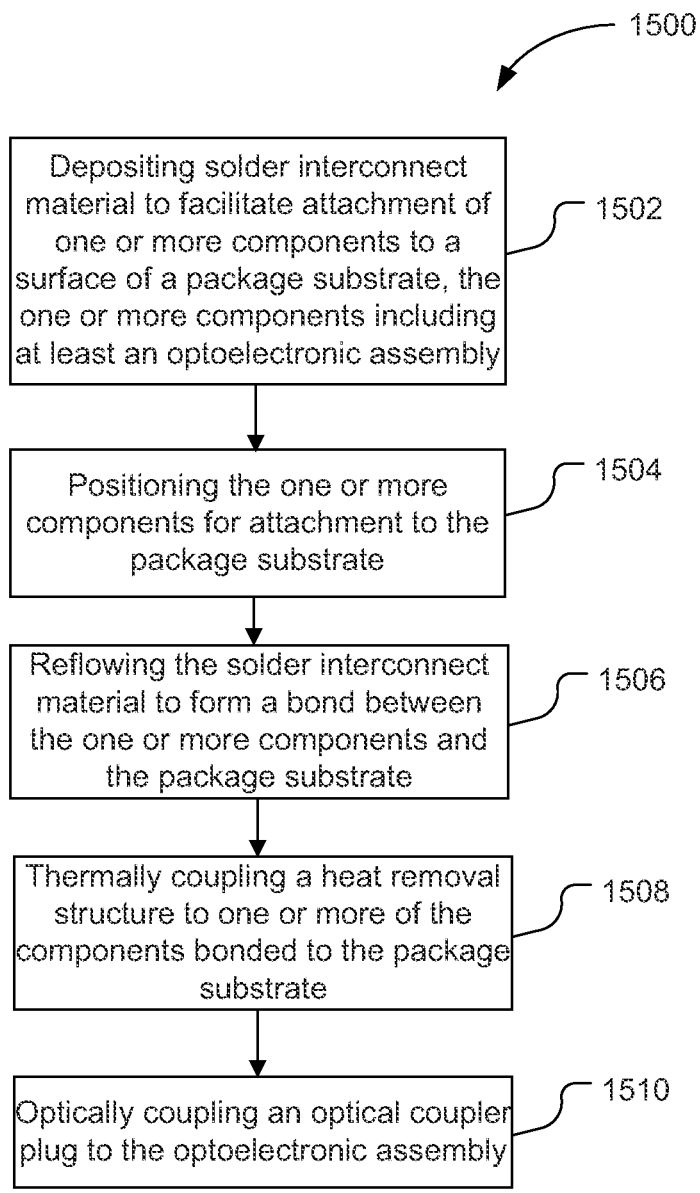
FIG. 15 is a flow diagram for a method of fabricating a processor-based system, in accordance with some embodiments.

FIG. 15 is a flow diagram for a method 1500 of fabricating a processor-based system (e.g., processor-based system 200 of FIG. 2), in accordance with some embodiments. The method 1500 may comport with techniques and configurations described in connection with FIGS. 1-14.

At 1502, the method 1500 may include depositing solder interconnect material (e.g., solder interconnect material of the interconnect structures 212a, 212b, 212c) to facilitate attachment of one or more components to a surface of a package substrate (e.g., package substrate 202 of FIG. 2). The one or more components may include at least an optoelectronic assembly (e.g., optoelectronic die 206 and transceiver die 210 of FIG. 2), and may further include, for example, a receptacle (e.g., receptacle 208 of FIG. 2), and/or a processor (e.g., processor 204 of FIG. 2). The components may include other structures or devices such as, for example, die side capacitors. The solder interconnect material may be deposited, for example, on surfaces of the components that are to be attached to the package substrate or on the surface of the package substrate, or combinations thereof. The solder interconnect material may be deposited using any suitable technique including, for example, printing a solder paste and/or using a spray flux process.

At 1504, the method 1500 may further include positioning the one or more components for attachment to the package substrate. In some embodiments, the components may be positioned using a pick-and-place process to position the components on a surface (e.g., surface S of FIG. 2) of the package substrate for a reflow process. In an embodiment, the receptacle and the optoelectronic assembly may be positioned on the package substrate such that they do not physically contact one another to facilitate solder self-alignment of these components. According to various embodiments, the optoelectronic assembly and the receptacle are positioned adjacent to a terminating edge (e.g., terminating edge 290 of FIG. 2) of the package substrate.

At 1506, the method 1500 may further include reflowing the solder interconnect material to form a bond between the one or more components and the package substrate. The reflow process may include the application of heat to cause softening of the solder interconnect material. The application of heat may include, in one embodiment, subjecting the solder interconnect material to a peak temperature of 260° C. or below. Temperature conditions for the reflow process may vary according to solder interconnect material type.

In some embodiments, a single reflow process simultaneously bonds the optoelectronic assembly and the receptacle to the package substrate. In other embodiments, a single reflow process simultaneously bonds the optoelectronic assembly, the receptacle, and the processor to the package substrate. Reflowing the deposited solder interconnect material may form electrical interconnect structures that electrically couple the optoelectronic assembly with the package substrate and dummy interconnect structures that structurally couple the receptacle with the package substrate. According to various embodiments, the reflow process results in solder self-alignment of the receptacle and optoelectronic assembly relative to the package substrate to provide optical alignment between one or more optical apertures (e.g., optical apertures 220 of FIG. 2) of the optoelectronic assembly and the optical coupler plug when the optical coupler plug is plugged into or otherwise fastened to the receptacle. The reflow process may be followed by a cleaning or deflux process to remove excess flux or residue and/or an underfill process to deposit underfill between the components and the package substrate.

At 1508, the method 1500 may further include thermally coupling an IHS or other heat removal structure (e.g., thermal interposer 1277 of FIG. 12 or thermal tongue 1388 of FIG. 13) to one or more of the components bonded to the package substrate. The heat removal structure can be bonded using, for example, thermally conductive interconnect structures or thermal adhesive. One or more openings (e.g., OTH 1333 of FIG. 13) may be formed in the heat removal structure to allow access to the one or more optical apertures of the optoelectronic assembly.

At 1510, the method 1500 may further include optically coupling an optical coupler plug (e.g., optical coupler plug 324 of FIG. 3) to the optoelectronic assembly. The optical coupler plug may include pluggable features that are configured to fasten the optical coupler plug to the receptacle such that the optical coupler plug is optically aligned with the one or more optical apertures of the optoelectronic assembly. In some embodiments, the optical coupler plug is attached to the receptacle using pluggable features of the optical coupler plug to adhere to the pluggable surface of the receptacle.

Figure 16:
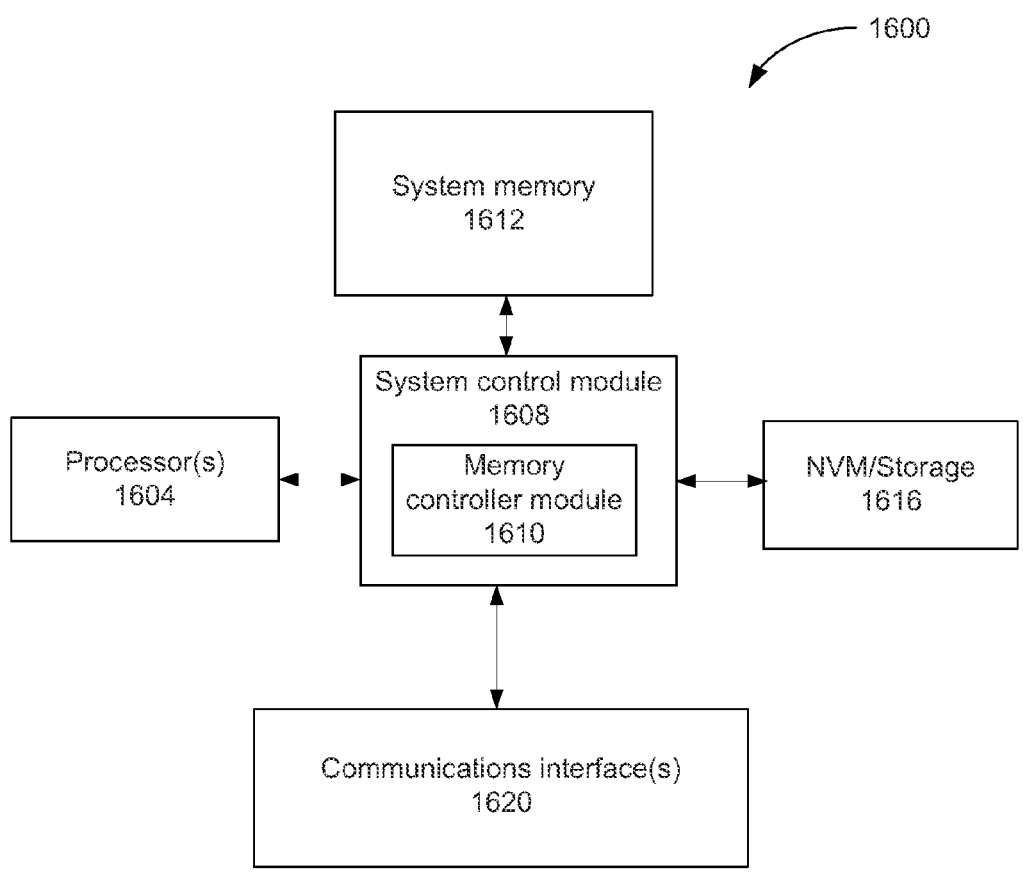
FIG. 16 schematically illustrates an example system that may be part of an optical interconnect system described herein in accordance with some embodiments.

Embodiments of the present disclosure may be implemented into a system using any suitable hardware and/or software to configure as desired. FIG. 16 schematically illustrates an example system 1600 (e.g., first processor-based system 125 of FIG. 1) that may be part of an optical interconnect system (e.g., optical interconnect system 100 of FIG. 1) described herein in accordance with some embodiments. In one embodiment, the system 1600 includes one or more processor(s) 1604. One of the one or more processor(s) 1604 may correspond, for example, with the processor 104 of FIG. 1 or the processor 204 of FIG. 2.

The system 1600 may further include system control module 1608 coupled to at least one of the processor(s) 1604, system memory 1612 coupled to system control module 1608, non-volatile memory (NVM)/storage 1616 coupled to system control module 1608, and one or more communications interface(s) 1620 coupled to system control module 1608.

System control module 1608 for one embodiment may include any suitable interface controllers to provide for any suitable interface to at least one of the processor(s) 1604 and/or to any suitable device or component in communication with system control module 1608.

System control module 1608 may include a memory controller module 1610 to provide an interface to system memory 1612. The memory controller module 1610 may be a hardware module, a software module, and/or a firmware module.

System memory 1612 may be used to load and store data and/or instructions, for example, for system 1600. System memory 1612 for one embodiment may include any suitable volatile memory, such as suitable Dynamic Random Access Memory (DRAM), for example.

System control module 1608 for one embodiment may include one or more input/output (I/O) controller(s) to provide an interface to NVM/storage 1616 and communications interface(s) 1620.

The NVM/storage 1616 may be used to store data and/or instructions, for example. NVM/storage 1616 may include any suitable non-volatile memory, such as Phase Change Memory (PCM) or flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 1616 may include a storage resource physically part of a device on which the system 1600 is installed or it may be accessible by, but not necessarily a part of, the device. For example, the NVM/storage 1616 may be accessed over a network via the communications interface(s) 1620.

Communications interface(s) 1620 may provide an interface for system 1600 to communicate over one or more wired or wireless network(s) and/or with any other suitable device.

For one embodiment, at least one of the processor(s) 1604 may be packaged together with logic for one or more controller(s) of system control module 1608, e.g., memory controller module 1610. For one embodiment, at least one of the processor(s) 1604 may be packaged together with logic for one or more controllers of system control module 1608 to form a System in Package (SiP). For one embodiment, at least one of the processor(s) 1604 may be integrated on the same die with logic for one or more controller(s) of system control module 1608. For one embodiment, at least one of the processor(s) 1604 may be integrated on the same die with logic for one or more controller(s) of system control module 1608 to form a System on Chip (SoC).

In various embodiments, the system 1600 may be, but is not limited to, a server, a workstation, a desktop computing device, or a mobile computing device (e.g., a laptop computing device, a handheld computing device, a handset, a tablet, a smartphone, a netbook, etc.). In various embodiments, the system 1600 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A system comprising:
   a package substrate having a surface upon which a processor is mounted;
   an optoelectronic assembly electrically coupled with the package substrate and the processor, the optoelectronic assembly having one or more optical apertures that emit and/or receive the light in a direction that is substantially perpendicular to the surface of the package substrate; and
   a receptacle mounted on the package substrate, the receptacle having a pluggable surface to receive an optical coupler plug such that the optical coupler plug is optically aligned with the one or more optical apertures of the optoelectronic assembly when the optical coupler plug is plugged into the pluggable surface of the receptacle, wherein the receptacle includes an electrically insulative material and is attached to the package substrate using one or more dummy interconnect structures.

2. The system of claim 1, wherein the one or more dummy interconnect structures include solder interconnect structures; and wherein the receptacle and the optoelectronic assembly do not physically contact one another to facilitate solder self-alignment of the receptacle relative to the package substrate.

3. The system of claim 1, wherein the optoelectronic assembly and receptacle are mounted adjacent to a terminating edge of the package substrate, the receptacle having a U-shape and substantially surrounding the optoelectronic assembly.

4. The system of claim 1, wherein the receptacle includes a material that is resistant to softening under temperature conditions associated with a solder reflow process, wherein the receptacle includes liquid crystal polymer (LCP) and the temperature conditions include a peak temperature less than or equal to 260° C.

5. The system of claim 1, wherein:
   the processor includes a central processing unit (CPU) of a mobile device; and
   the optoelectronic assembly is controlled by the processor to emit and/or receive optical signals in the form of light for the processor, the optoelectonic assembly including a transceiver die mounted on the package substrate using one or more electrical interconnect structures and another die having a plurality of vertical cavity surface emitting lasers (VCSELs) and/or photodectors (PDs), the another die being mounted on the transceiver die and electrically coupled to the package substrate through the transceiver die.

6. The system of claim 1, wherein a surface of the receptacle that is farthest in reference to the package substrate is closer to the surface of the package substrate than a surface of the processor that is farthest in reference to the package substrate.

7. The system of claim 1, further comprising:
   the optical coupler plug, the optical coupler plug being attached to the pluggable surface of the receptacle using one or more pluggable features of the optical plug such that the optical coupler plug is optically aligned with the one or more optical apertures of the optoelectronic assembly,
   wherein the optical coupler plug includes a material that is optically transparent at a wavelength of the light emitted and/or received by the optical apertures of the optoelectronic assembly, and
   wherein the optical coupler plug is to redirect the light by 90 degrees to or from the optoelectronic assembly.

8. The system of claim 7, wherein the one or more pluggable features of the optical coupler plug are to mate and unmate with the pluggable surface of the receptacle multiple times, wherein the optical coupler plug comprises perfluorocyclobutyl (PFCB) or glass.

9. The system of claim 1, wherein the package substrate is a final product.

10. An apparatus comprising:
    a receptacle for mounting on a surface of a package substrate, the receptacle having a pluggable surface to receive an optical coupler plug such that the optical coupler plug is optically aligned with one or more optical apertures of an optoelectronic assembly that is to emit and/or receive light using the one or more optical apertures in a direction that is substantially perpendicular to the surface of the package substrate when the optoelectronic assembly is affixed to the package substrate, wherein the receptacle includes an electrically insulative material and is to attach to the package substrate using one or more dummy interconnect structures.

11. The apparatus of claim 10, wherein the receptacle has a U-shape and is to substantially surround the optoelectronic assembly when the receptacle is attached to the package substrate.

12. The apparatus of claim 10, wherein the receptacle includes a material that is resistant to softening under temperature conditions associated with a solder reflow process, wherein the receptacle includes liquid crystal polymer (LCP) and the temperature conditions include a peak temperature less than or equal to 260° C.

13. The apparatus of claim 10, wherein, when the receptacle is attached to the package substrate, a surface of the receptacle that is farthest to the package substrate is closer to the surface of the package substrate than a surface of a processor that is farthest to the package substrate, when the processor is mounted on the package substrate.

* * * * *